United States Patent [19]

Kosalos et al.

[11] 4,075,599
[45] Feb. 21, 1978

[54] UNDERSEA GEOPHYSICAL EXPLORATION

[75] Inventors: James George Kosalos, Kirkland; Robert William Cooke, Issaquah, both of Wash.

[73] Assignee: The International Nickel Company, Inc., New York, N.Y.

[21] Appl. No.: 746,184

[22] Filed: Nov. 30, 1976

[51] Int. Cl.$^2$ .............................................. G01S 9/66
[52] U.S. Cl. .................................. 340/3 R; 340/3 T; 340/7 R
[58] Field of Search ......................... 340/7 R, 3 R, 3 T

[56] References Cited

U.S. PATENT DOCUMENTS

| 3,142,032 | 7/1964 | Jones | 340/3 R |
| 3,304,532 | 2/1967 | Nelkin et al. | 340/3 R |
| 3,484,737 | 12/1969 | Walsh | 340/3 R |
| 3,585,578 | 6/1971 | Fischer, Jr. | 340/3 R |
| 3,716,824 | 2/1973 | Dorr | 340/3 R |
| 3,742,436 | 6/1973 | Jones | 340/3 R |
| 3,757,287 | 9/1973 | Bealor, Jr. | 340/3 R |
| 3,950,723 | 4/1976 | Gilmour | 340/3 R |
| 4,030,096 | 6/1977 | Stevens et al. | 340/3 R |

OTHER PUBLICATIONS

Chesterman et al., "An Acoustic Aid to Sea-Bed Survey", *Acoustica*, 8, 285-290, 1958.
Tucker et al., "A Narrow-Beam Echo-Ranger for Fishery and Geological Investigations", *Brit J. Appl. Phys*, 12, 103-110, 1961.

Primary Examiner—Howard A. Birmiel
Attorney, Agent, or Firm—George N. Ziegler; Ewan C. MacQueen

[57] ABSTRACT

Process and apparatus for underwater geophysical exploration to prepare surveys of undersea floor areas having solid minerals, such as manganese nodules, dispersed at sea floor surfaces transmits and perceives special acoustic vibrations providing information useful for identifying and delineating sea floor areas where desirably large amounts of solid minerals are present.

10 Claims, 4 Drawing Figures

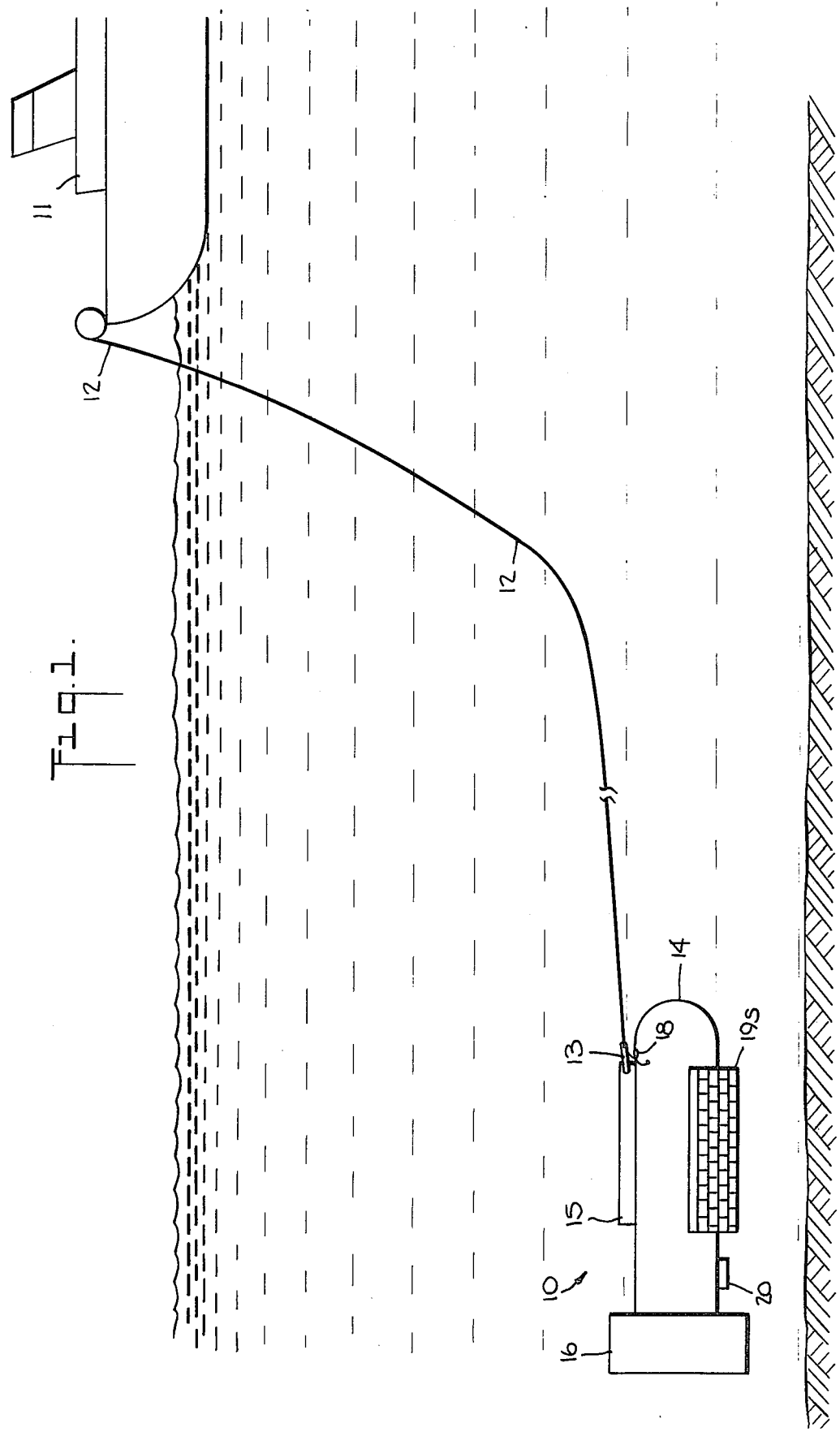

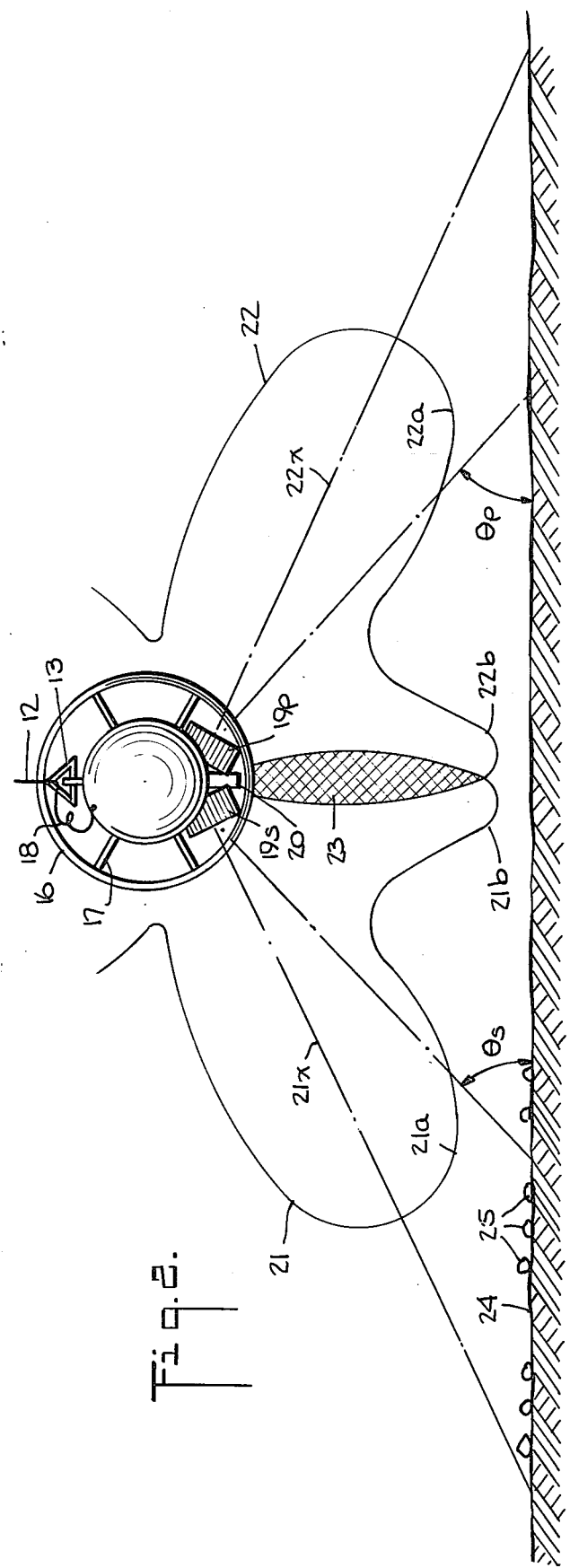

UNDERSEA GEOPHYSICAL EXPLORATION

The present invention relates to geophysical exploration and more particularly to underwater geophysical exploration and geophysical surveying for solid minerals on the undersea floor.

It is known that aggregates of solid minerals, e.g., manganese nodules, have been found on many areas of the deep ocean bottoms and other undersea floors. Underwater photography and television, and ocean bottom sampling techniques such as mechanical or suction dredging, have shown that manganese nodules are scattered in various concentrations at many different places on the deepsea floors. Moreover, spots where at least some manganese nodules have been found have been charted on maps of the ocean floors. Proposals have been made to mine the ocean floor to obtain commercially worthwhile amounts of minerals such as manganese nodules. In order to most efficiently apply undersea mining methods and equipment, it is important to identify and delineate undersea floor areas having a relatively large proportion of the floor, e.g., 25 or 50% or more of the floor area, covered with desired minerals such as manganese nodules.

There has now been discovered a process and apparatus for underwater geophysical exploration with waterbourne acoustic vibrations, sometimes referred to as sonar beams or insonification.

An object of the present invention to provide a process for underwater geophysical exploration and surveying.

Another object of the invention is to provide apparatus for underwater geophysical exploration and surveying.

Further objects and advantages of the invention will become apparent from the following description taken in conjunction with the accompanying drawing wherein:

FIG. 1 is a side view of an embodiment of the underwater exploration vehicle of the invention;

FIG. 2 is a front view of the vehicle referred to by FIG. 1 and includes an illustration of an acoustic beam transmission pattern in the process of the invention;

FIG. 3 depicts a front view of another beam pattern for the process of the invention.

Figure 4:
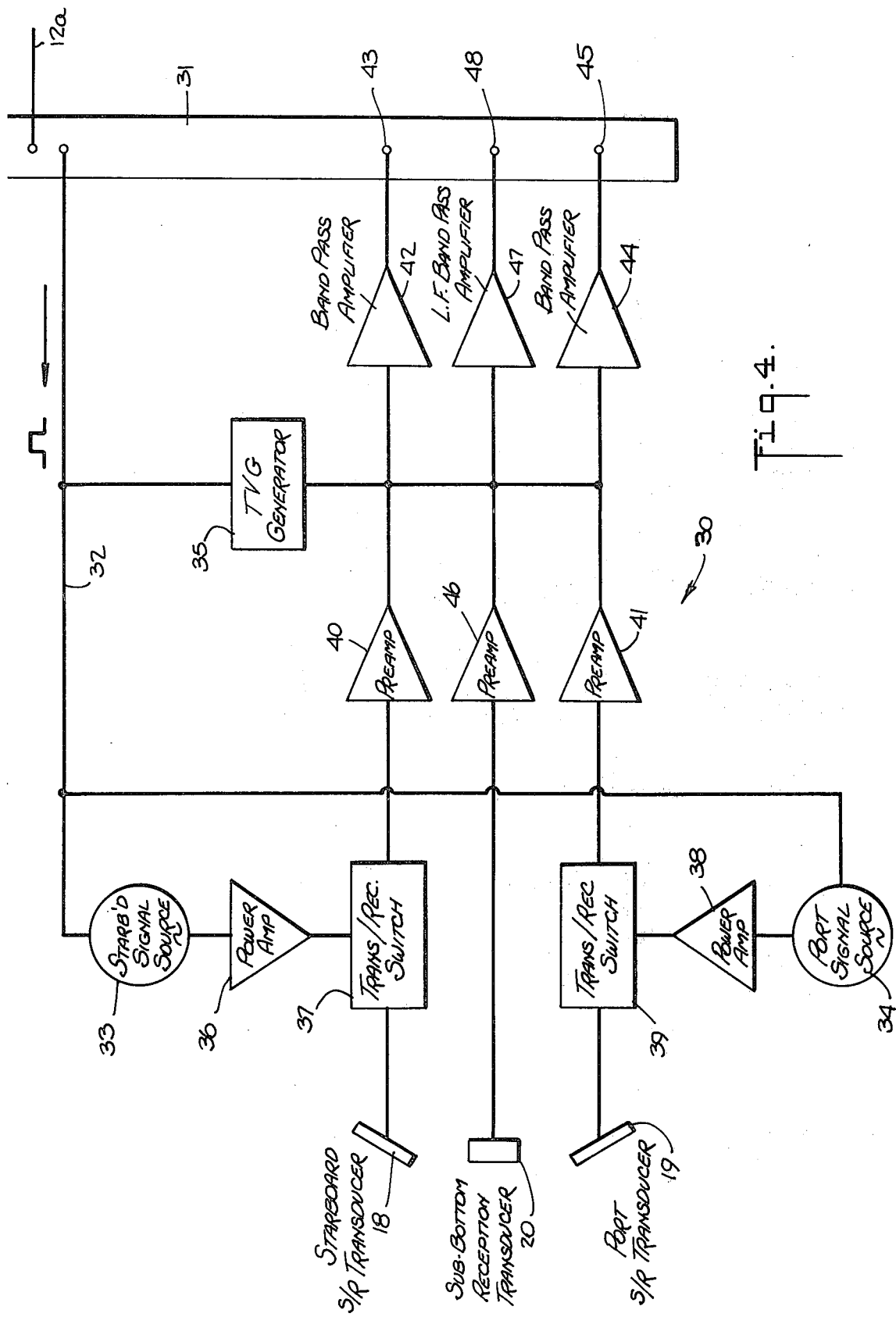
FIG. 4 is a block diagram of electronic circuitry for transmitting and detecting acoustic vibrations with transducers carried by the vehicle of FIG. 1.

The present invention contemplates transmitting, and perceiving special backscattered and reflected echoes therefrom, two partially overlapping underwater acoustic beams (sonar beams) that are of different frequencies and directed bilaterally away from each other at angles slanting downward sufficiently for the beams to intersect, or "graze", the undersea floorline at relatively large grazing angles generally ranging from about 20° to 65°. The two bilaterally directed beams are transmitted at primary frequencies in the range of 12 to 40 kHz (kilohertz) and differ at least about 2 kHz from each other. Portions of the beams (including side lobes) overlap each other equilaterally within a small angle, e.g., about 1°, 2° or 3°, on each side of the downward vertical, and, inasmuch as the frequencies are different, the overlapping portions of the beams interact, as in sound wave interference, to form a difference-frequency beam that is directed vertically downward in a narrow angle. The primary frequency vibrations arriving at the sea-floor in the grazing angle range are backscattered, thereby forming underwater echoes from undersea floor material, and the backscattered echoes are perceived (received and detected) and utilized to provide electric signals that are informative of undersea floor material characteristics. The difference-frequency beam acts as a narrow, vertically downward, high resolution beam that penetrates into the sub-bottom material beneath the floorline and is then reflected vertically and perceived to provide signals indicative of the sub-bottom characteristics.

For exploration of the undersea floor, the acoustic beams are transmitted and perceived with transducers on an underwater vehicle moving in a forward, linear direction at a substantially constant altitude above the undersea floor. Substantially constant altitude is to be understood as being as constant as is practical, inasmuch as maintaining precisely constant altitude above all undulations, ridges, canyons, etc. in the sea floor may be impossible, and, with practical skill of altitude maintenance, useful surveys can be accomplished in spite of unavoidable altitude variations. For the most part, in general, the forward movement is horizontal. The main portions, or lobes, of the transmitted beams are directed bilaterally away from each other, slanting downward in a plane perpendicular to the direction of forward movement, and side portions of the beams overlap at the downward vertical and provide the downwardly directed difference-frequency beam.

Fore-and-aft widths of the beams are desirably restricted to the minimums obtainable when practical considerations, e.g., costs of apparatus, efficiency of energy utilization, are balanced against each other. Restriction to about 3°, or less, fore and aft of the vertical is considered satisfactory for practical operations at short unilateral mapping distances, with further restriction being desirable for limiting the bottom insonified area at greater mapping ranges.

The transducers on the vehicle can be piezo-electric transducers or magnetostrictive electromechanical transducers. It is desirable to make the transmitting transducers also capable of perceiving and converting acoustic vibrations to electric signals in order to avoid the disadvantage of additional weight and space for carrying separate reception transducers on the vehicle, albeit bistatic sonar with separate transmit and receive transducers can be used if desired. The difference-frequency beam reception transducer does not need capability for transmitting (projecting) and, accordingly, can be a hydrophone. The invention provides ability to differentiate abyssal nodule-bearing areas from the barren sedimentary plains and other deepsea areas bearing no nodules, and it is to be understood that it is not the aim of the invention to detect or profile individual acoustic targets. Moreover, along with nodule detection, the invention provides high resolution profiling of the sub-bottom with the difference-frequency beam directed directly down from the vehicle.

The process is generally conducted at depths below waterwave action, for the most part at least 1000 meters below the sea surface. Even so, it is desirable that the vehicle have direction stabilizing means in order to maintain a true course and hold the transducer orientation constant, especially to restrict detrimental yaw. The transmitting frequencies referred to herein are for use in deep ocean water where ambient water pressures are sufficiently great to inhibit cavitation.

The acoustic frequencies and insonification angles of the process of the invention are particularly beneficial for achieving efficiency in detection of manganese nodules and in distinguishing ore-bearing sea floor areas, where a large proportion is covered with manganese nodules, in contradistinction from floor areas where manganese nodules are scarce or absent. The frequency transmission band is also beneficial, inter alia, for avoiding excessive attenuation in water and excessive superficial bottom reflections.

For carrying the invention into practice it is recommended that the vehicle be towed at an altitude of 200 to 2000 meters above the bottom and insonify two paths at grazing angles from about 20° to about 60° or 65° on either side of the vehicle track, in order to obtain strongly scattered returns or echoes where manganese nodules are distributed on the undersea floor. According to the vehicle altitude when in the range of 200 to 2000 meters, the paths insonified at grazing angles of 20° to 60° are of 400 to 4000 meters width, the path width being measured outward starting at a floorline point where the horizontal distance from the vehicle track is equal to one-half the vehicle altitude. The process provides delineation of nodule area distribution on the deep sea floor at areal rates up to 22 km$^2$/hr in two wide swaths, each up to 4000 meters wide on either side of the vehicle track, with a vehicle speed of about 2.75 km/hr. Along with detection of nodules the process provides signals indicative of nodule size and distribution and also signals having sub-bottom profile information.

To obtain most favorable bottom insonification geometry and the greatest areal rate of survey, the vehicle is towed at an altitude of about 40% of its maximum unilateral mapping range. Maximum mapping range refers herein to the maximum horizontal distance, from the vehicle track, that apparatus associated with the vehicle can insonify effectively for returning signals at the detection threshold of the vehicle apparatus.

Referring now to the accompanying drawing, FIGS. 1 and 2 refer to an underwater acoustic transducer vehicle transmitting acoustic beams bilaterally at downward slanting angles. For use in underwater geophysical surveying the vehicle, designated generally by numeral 10, can be towed by surface ship 11 with tow cable 12 connected from the ship to yoke 13 attached to the vehicle. Vehicle 10 has body 14, fin 15 (to which the yoke is connected) and directional stabilizing shroud 16 supported on the body by struts 17. Electric power and communications conductor cable 18 is carried, for most of its length, in the tow cable and has the lower end extending into the vehicle body. The vehicle carries starboard send/receive transducer array 19S, port send/receive transducer array 19P and bottom beam reception transducer 20.

FIG. 2 illustrates beam patterns of vibration beams directed slanting downward bilaterally from vehicle 10. Transmission patterns providing centered, equilaterally overlapping, portions that extend further down than the main lobes and a difference-frequency beam directed vertically down from the vehicle, as depicted in FIG. 2, are especially recommended for achieving advantageously beneficial results of narrow beam, high resolution, sub-bottom profiling at the difference frequency.

On FIG. 2, the underwater vibration pattern transmitted at frequency $f_s$ from the starboard transducer is depicted with line 21 and the port transmission pattern transmitted at frequency $f_p$ is depicted with line 22. Main lobe and lower side lobes of the transmission patterns are at portions 21a and 21b, respectively, and at 22a and 22b respectively. Acoustic axes of the beams are depicted with broken lines 21x and 22x. In the zone where the starboard and port patterns overlap (identified with cross-hatching on FIG. 2), a vertically directed beam 23 is developed at a third frequency, which is the difference ($f_s-f_p$) between the frequencies of the starboard and port transmissions. The starboard and port transducers are directed to transmit mainly at angles slanting substantially below the horizontal. Inasmuch as FIG. 2 depicts a cross-section of the vibration waves, it is understood that the transmitted waves, and also the difference-frequency wave, progress and impinge on undersea floor 24 and materials thereon, e.g., manganese nodules 25, with a substantial portion, desirably 75% or more of the transmitted energy, of the beams intersecting the floor at grazing angles of 20° to 60°, e.g., angle $\theta_s$ on FIG. 2, and at port, a corresponding angle theta$_p$.

FIG. 3 depicts another pair of downwardly slanting, equilaterally overlapping, bilaterally transmitted beam patterns that are satisfactory for the process, although not providing the advantageously deep extension of the difference-frequency beam in relation to the main lobes, depicted in FIG. 2. Transducers for projecting the beam patterns 26 and 27 of FIG. 3, that have the difference-frequency pattern 28 of lesser depth are, at least in some instances, less costly than transducers for beam patterns of FIG. 2. Yet, the efficiency of conversion of energy to the third (or difference) frequency is directly proportional to the length of the region of acoustic beam interference.

FIG. 4 shows a block diagram of an electronics circuit suitable for use in transmitting and receiving acoustic vibrations in embodiments of the invention. The circuit, referred to generally by numeral 30, is schematically depicted connected to communications cable 12a and to transducers 19 and 20 on vehicle 10 of FIG. 1. Circuit 30 receives a time-controlled trigger pulse (which can be provided by a pulse generator and timer clock aboard ship) transmitted through communications cable 12a of FIG. 1, and presently shown connected to junction box 31 on FIG. 4. The trigger pulse is fed through input lead 32 to starboard acoustic beam signal source 33 and to port acoustic beam signal source 34 and also to time varying gain function generator 35. The starboard signal source is connected to feed signals through power amplifier 36 and, for transmitting acoustic vibrations, through transmit/receive switch 37 to starboard transducer 19; similarly, port signal source 34 is connected to feed through power amplifier 38 and transmit/receive switch 39 to port transducer 19. Transmit/receive switches 37 and 39 are also connected to preamplifiers 40 and 41. For perceiving and electrically amplifying signals corresponding to received underwater vibrations, the transmit/receive switches are closed to inputs from the power amplifiers and open directionally for directing transducer reception signals to the preamplifiers. Starboard beam preamplifier 40 is connected to band-pass amplifier 42 which connects to starboard reception output terminal 43; similarly, port preamplifier 41 is connected for feeding signals to band-pass amplifier 44 and thence to port reception beam output terminal 45. Also, circuit 30 has preamplifier 46 connected and tuned for receiving and amplifying the sub-bottom difference-frequency signal from reception transducer 20. The preamplified difference-frequency signal is conveyed to another band pass amplifier, 47, having a frequency response selected according to the difference frequency and is passed thence to sub-bottom signal output terminal 48. Time varying gain function generator 35 is connected to starboard signal band-pass amplifier 42 port signal band pass amplifier 44 and to sub-bottom signal band pass amplifier 47 in order to electronically adjust the amplifier gain and compensate for spherical spreading losses which accrue by virtue of the distance the acoustic energy has traveled.

Electric signals arriving at output terminals 43, 45 and 48 can be displayed, recorded or stored by connecting the outputs to information display/storage components such as oscilloscopes, strip chart recorders and magnetic tape or disc recorders, desirably with selector switches connected for enabling simultaneously displaying and recording on a plurality of components that are carried on a surface ship in communication with the underwater vehicle.

For conducting deepsea floor surveying with control and reception at a surface ship, the trigger pulse generator and the clock-timer can be carried in the surface ship and the other components of circuit 30 can be mounted in a watertight chamber, desirably capable of withstanding water pressure up to about ½ megapascal (0.5 MPa) carried by an undersea vehicle, such as the body of vehicle 10. The communications cable, 12a, can be an armored coaxial vehicle-to-ship communications cable which may be enclosed in the tow cable. It is desirable to have a computer aboard ship for initiating and controlling underwater vibration transmissions and for processing, utilizing or storing signals received from the underwater vehicle. And, among other things, it is desirable to have the shipboard computer provided with vehicle depth information transmitted from a pressure-activated depthometer on the vehicle.

Sonar exploration and surveying benefits of the invention can be supplemented with underwater photography, television and/or bottom sampling performed by apparatus in separate vehicle(s) moved along with, and possibly attached to, the acoustic transducer vehicle. Or, at loss of some of the compactness advantages of the invention, a relatively large body for the vehicle can carry supplemental apparatus in addition to the acoustic apparatus.

For the purposes of giving those skilled in the art a better understanding of the practice and use of the invention, the following illustrative examples are given:

EXAMPLE I (High Survey Rate)

Two acoustic vibration beams of different frequencies are transmitted bilaterally in downwardly slanting directions from two arrays of electromechanical transducers fixed beneath the starboard and port sides of an underwater vehicle moving forward in a linear horizontal direction at an altitude of 2000 meters above the undersea floor of an ocean area about 5 km deep in the ocean while being towed by a surface ship at a speed of 1.5 knots (2.8 Km/hr). The transmitted frequencies are 18 kHz from the starboard transducer and 20 kHz from the port transducer. Transmissions are in pulses of 500 microseconds at 10 second intervals controlled by a clock-timer on the ship. Transmitting power input is 30 kw (kilowatt) to each transducer. The acoustic axis of each beam is slanted downward at an angle 22° below the horizontal perpendicular to the line of forward movement; thus, the main acoustic axes are directed to impinge on the floor at grazing angles of 22°. Impingement of the main beams onto manganese nodules located where the grazing angle with the floorline is 22° (about 5000 meters horizontally from the line of forward movement when projected down to the floor), and generally throughout the range of 20° to 60°, results in strong backscatterred echo vibrations. At times between pulses the transducers are switched to reception circuits, and acoustic energy of vibrations that are backscattered from nodules is detected by the starboard and port transducers and converted to electric signals, and the amplitudes of the signals are displayed on an oscilloscope and recorded on a facsimile recorder. The strength (amplitude and quantity) of signals received over the area where about 20% or more of the floor area is covered with manganese nodules is noticeably and substantially greater than any signals that are detected when making the same kind of transmissions over other undersea floor areas where nodules are absent or scarce and the floor is covered with other material having different signature characteristics such as silt, basalt flow, rock outcrops, slate or mud. A portion of each beam, in the present example a side lobe of each beam, extends about 2° to each side of the downward vertical, and accordingly, the beams form an overlap area (in vertical cross-section) of about 4° where the two frequencies interfere and form a vertically downward difference-frequency (DF) beam with a frequency of 2 kHz. The DF beam is reflected upward from the sea floor after some sub-bottom penetration, depending on the bottom hardness and density characteristics, and is perceived by a reception transducer on the underwater vehicle and converted to electric signals which are recorded and displayed. The recorder and display apparatus for the backscattered reception and the difference-frequency reception are located on the surface ship which tows the vehicle. On board ship, ocean floor maps are marked to show areas where high backscattered signal reception indicates presence of desired quantities of manganese nodules, and sub-bottom penetration contour lines are also entered, thereby providing a geophysical survey chart.

EXAMPLE II (Low Survey Rate)

An underwater vehicle having transmit/receive transducers at the starboard and port sides and a hydrophone at the underside, aft of the transmitters, is towed at an altitude of 200 meters above a deep ocean floor. Towed speed is 1.8 km/hr. The starboard and port transducers project acoustic beams bilaterally and slanting downward with the acoustic axis of each beam directed at a grazing angle of 30° and with the main lobe of each insonifying a 400 meter wide path at grazing angles of about 20° to about 63°. Vibration frequencies are 27.5 and 30.0 kHz from starboard and port, respectively. The beam patterns overlap in an interaction zone providing a difference-frequency beam about 20° wide and 2° thick (fore-and-aft) at 2.5 kHz. Vibration transmissions are triggered in 300 microsecond pulses, 1 second apart, from a shipboard computer communicating with the vehicle through an armored coaxial cable. Vibrations from the starboard and port beams are backscattered from manganese nodules lying in the insonified paths 100 meters and more to each side of the ground track of the vehicle, and the backscattered vibrations, at 27.5 and 30.0 kHz, are detected and converted to electric signals by transducers and electric circuits on the vehicle and then telemetered to the surface ship where the signals are displayed and recorded. The low-frequency reflections from the DF beam are perceived and converted to electric signals by the hydrophone receiving transducer and associated circuit and are telemetered to a shipboard recorder, thus enabling narrow beam, high resolution, sub-bottom profiling along with simultaneous charting of the nodule detection signals. Depthometer information is also simultaneously transmitted up from the vehicle, for incorporation into the survey results.

EXAMPLE III (Floor Sampling)

A vehicle conducting an acoustic survey as in Example II at a slower speed of 1.0 km/hr tows behind it, 75 meters in trail at an altitude 5 meters deeper, another underwater vehicle (bottom study vehicle) carrying downwardly directed underwater photography, television and bottom sampling apparatus and a communication cable to the acoustic survey vehicle. When signals received aboard ship from the acoustic survey vehicle indicate that the survey vehicle is passing above a desirable mining floor area having many nodules, both vehicle are lowered near to the sea floor and trigger pulses are sent to the downwardly directed apparatus on the bottom study vehicle to obtain additional, more comprehensive, information concerning the sea floor conditions. According to desire and need, bottom study information can be televised to the surface, or taped, and/or stored as photographs, and bottom samples can be obtained for subsequent transit to the surface.

The present invention is particularly applicable to geophysical exploration of undersea floors in order to find and survey undersea floor areas having large quantities of desirable mineral aggregates such as manganese nodules or other minerals at the floors of oceans or deep lakes.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. A process for geophysical surveying of an undersea floor area to obtain information indicative of physical characteristics of material on the undersea floor comprising:
   (a) moving an undersea vehicle under water in a forward linear direction at a substantially constant altitude above the undersea floor;
   (b) transmitting bilaterally from said vehicle two underwater acoustic beams, one at a first frequency and the second at a second frequency, both frequencies being in the transmitting frequency range of 12 to 40 kHz and differing from each other by a difference frequency of at least 2 kHz and each with power sufficient to intersect, and produce perceivable echos from, the undersea floor;
   (c) said beams being directed bilaterally away from each other, one to the starboard and one to the port, with the acoustic axis of each beam in a plane perpendicular to the forward line of vehicle movement and slanted downward to intersect the undersea floorline at a grazing angle in the angular range of about 20° to 65°;
   (d) each of said two beams having a portion extending vertically down to the undersea floor and sideward from the vertical at least about one degree from each side of the downward vertical from the vehicle and forming a downwardly directed difference-frequency beam of at least about two degrees width impinging on the undersea floor;
   (e) perceiving underwater vibrations backscattered from where the starboard and port beams impinge on material of the undersea floor;
   (f) converting the perceived backscattered vibrations to electric signals indicative of the amplitude of the backscattered vibrations reaching the undersea vehicle;
   (g) displaying, storing or recording the amplitudes of the backscattered vibration signals;
   (h) perceiving acoustic vibration at the difference-frequency reflected upward from where the difference-frequency impinges on undersea floor material;
   (i) converting the perceived difference-frequency vibrations to electric signals indicative of the amplitude of the difference-frequency vibrations; and
   (j) displaying, storing or recording the amplitudes of the difference-frequency signals.

2. A process as set forth in claim 1 wherein the vehicle is moved at a depth of at least 1000 meters below the sea surface.

3. A process as set forth in claim 1 wherein the altitude above the undersea floor is 200 to 2000 meters.

4. A process as set forth in claim 1 wherein the difference-frequency is not greater than 5 kHz.

5. A process as set forth in claim 1 wherein the difference-frequency beam width is restricted to not greater than 6 degrees.

6. A process as set forth in claim 1 wherein the vehicle is towed at an altitude about 40 percent of the maximum unilateral mapping range.

7. A process as set forth in claim 1 comprising transmitting the acoustic beams to intersect and produce perceivable echos from an undersea floor area wherein one or more manganese nodules have been found.

8. A process as set forth in claim 1 which further comprises photography, television or bottom sampling of an undersea area that is surveyed according to the process of claim 1.

9. Undersea exploration apparatus comprising:
   (a) a watertight body having a configuration suitable for being towed underwater in a forward linear direction;
   (b) two electromechanical transducers attached to the body and operable to transmit bilaterally from the body, when the body is moving forward underwater, two acoustic beams, one at a first frequency and the second at a second frequency, with both frequencies in the range of 12 to 40 kHz and differing from each other by a difference frequency of at least 2 kHz, and to direct the beams bilaterally away from each other in a plane perpendicular to a forward linear direction for moving the body and provide that the beams intersect the undersea floor line, at least when the body is within a vertical distance of 200 meters above the undersea floor, at grazing angles of 20° to 65° and produce perceivable echos from the floor, and also provide that the beams overlap each other at least 1° on each side of the downward vertical and interact to form a downwardly directed difference-frequency beam;

(c) a first-frequency receiving means electrically responsive to underwater echos backscattered from the first-frequency beam;

(d) a second-frequency receiving means electrically responsive to underwater echos backscattered from the second-frequency beam;

(e) a difference-frequency receiving means electrically responsive to underwater echos reflected from the difference-frequency beam;

(f) means for energizing the two electromechanical transducers to transmit underwater vibrations at the two transmission frequencies; and (g) electric circuit means for transmitting electrical responses from the three receiving means to three corresponding output terminals.

10. Apparatus as set forth in claim 9 wherein the first-frequency transmitting transducer is a piezo-electric transducer capable of also functioning as the first-frequency receiving means, the second-frequency transmitting transducer is a second piezo-electric transducer capable of also functioning as the second-frequency receiving means and the difference-frequency receiving means is a third piezo-electric transducer.

* * * * *